United States Patent [19]
Hiraga et al.

[11] Patent Number: 5,633,043
[45] Date of Patent: May 27, 1997

[54] PROCESS FOR FABRICATING THIN FILMS

[75] Inventors: Takashi Hiraga; Tetsuo Moriya, both of Ibaraki, Japan

[73] Assignees: Research Development Corporation of Japan, Saitama; Agency of Industrial Science and Technology, Tokyo, both of Japan

[21] Appl. No.: 366,766

[22] Filed: Dec. 30, 1994

[30] Foreign Application Priority Data

Mar. 9, 1994 [JP] Japan ................................. 6-066706

[51] Int. Cl.⁶ ....................................................... B05D 7/00
[52] U.S. Cl. ........................... 427/421; 427/168; 427/384; 427/385.5; 427/426
[58] Field of Search ......................... 427/421, 426, 427/384, 385.5, 168

[56] References Cited

U.S. PATENT DOCUMENTS

| | | | |
|---|---|---|---|
| 3,378,396 | 4/1968 | Zaromb | 428/428 |
| 4,091,172 | 5/1978 | Miller | 427/168 |
| 4,228,220 | 10/1980 | Garrison | 427/168 |
| 4,783,340 | 11/1988 | McDonell et al. | 427/166 |
| 4,837,046 | 6/1989 | Oishi et al. | 427/426 |

*Primary Examiner*—Benjamin Utech
*Assistant Examiner*—David M. Maiorana
*Attorney, Agent, or Firm*—Wenderoth, Lind & Ponack

[57] ABSTRACT

A process for producing thin films includes a step of dissolving one or two or more thin film materials into solutions or dispersions that are sprayed respective spray nozzles provided for each component onto a substrate in a high vacuum vessel. The components are deposited on the substrate and then are heated.

16 Claims, 7 Drawing Sheets

PROCESS FOR FABRICATING THIN FILMS

FIELD OF THE INVENTION

The present invention relates to a process for fabricating thin films. The invention relates more specifically to a new process which permits production at high efficiencies of high-quality wavelength-selective transmission films, reflection thin films, optical non-linear effect films and other high-function optical thin films which are particularly useful for photo-electric conversion devices and other optical technologies as well as for optoelectronics technologies.

PRIOR ART

Conventionally, thin films of a range of compositions have been employed in various fields of application. For instance, semiconductor superlattice thin films, represented by GaAs series, have been generally used for electronics technology. Also films using the absorption or interference properties of light offer wavelength selective transmission or reflection functions for optical applications. A particularly note-worthy recent trend among these thin films is the creation of optical thin films which offer much higher functions than conventional films. The new products are intended for use in application for multiple high-speed parallel information processing using multiplicity of light or for the application of optical non-linear effect or optoelectrical effect.

For the fabrication of two types of these new high-function optical thin films, two types of materials have captured attention; semiconductor a microns and organic optical materials. Devices for fabricating semiconductor particulate materials using semiconductor particulates are generally those for fabricating thin films employing heat vaporization processes. The methods for producing thin films on which the devices therefore basically operate include vacuum deposition, ion beam, spattering, and vapor phase polymerization, all of which have been generally accepted. One feature is common to these methods: under vacuum conditions, substances to be treated are heated to elevated temperatures, causing high vapor pressures to be generated, and changed into atoms or clusters for transportation to a substrate. Each of these methods is different in the process by which atoms or clusters are generated under vapor phase. The advantages of using vacuum are the protection of the substances against oxidation and the easier transportation of atoms and clusters to a substrate. These processes also permit using multiple sources of substances for the preparation of composite thin films.

On the other hand studies have been under way, relating to devices for fabricating organic optical thin films using organic optical materials. Among the thin-film producing processes on which these devices work fundamentally, the following are generally known:

(1) Wet method using solutions, dispersions or development liquids

These methods include: painting, blade coating, roll coating, spin coating, dipping, spray and other coating methods, planography, letterpress, calcography, screen, transfer and other printing technologies, electrodeposition, electrolytic polymerization, micell electrolysis (Japanese Patent Provisional Publication No. 243298/88) and other electrochemical methods, and the Langmuir Blogatt technique by which a monomolecular film formed on water is shifted for the formation of thin films.

(2) Methods using the polymerization of raw material monomers or polycondensation reactions If a monomer is a liquid, for instance, the methods that can be employed include casting technique, reaction injection molding, and plasma polymerization and photopolymerization (3) Methods employing gaseous molecules (vaporization by heating)

They include sublimation transfer, deposition, vacuum deposition, ion beam, spattering, plasma polymerization, and photopolymerization techniques.

(4) Methods using melting and softening

This category includes hot press method (Japanese Patent Provisional Publication No. 99609/92), injection molding, elongation method and single crystallization of melted thin films.

Each of these conventional processes can, however, fabricate only optical thin films which are comparatively simple in composition and structure. They are not suited to the preparation of high-function organic optical thin films which permit the control of more sophisticated microstructures.

By a conventional process for fabricating composite optical thin films, for example, when organic ion crystals and other materials with no fusing point are used, they are decomposed by heating, and even though they have their own fusing points, they are decomposed even at their vaporization temperatures. Accordingly, it was difficult to control these phenomena, and, even if it was possible to do so, to achieve high-function organic optical thin films.

In order to solve these problems, the present inventors provided a method for forming an organic optical thin film, by spraying a solution or dispersion containing an organic optical material in high-vacuum vessel, depositing an organic optical thin film onto a substrate, and heating the thin film.

This method makes it possible to form an optical thin film having a controlled structure of fine area below nanometer size, at a temperature lower than the decomposition temperature of the organic optical material.

However, when attempts are made to use multiple components or organic optical materials to produce composite organic thin films, the conventional techniques for producing organic optical thin films have limitations in the selection of materials which can be combined for use and be sprayed simultaneously and also in the selection of the solvents that dissolve or disperse the components thereof. When a different component is used for spraying in place of one that has been in use, the need arises to prevent the new components from mixing with the existing one in the piping to the spray nozzle. To meet such need, after each completion of spraying, it was required to purge with a solvent the inside of the piping to the spray nozzle. This resulted in a significant reduction in operation efficiency.

This has automatically limited the use of the conventional method for producing composite optical thin films to efficiently fabricate high-function composite optical thin films.

SUMMARY OF THE INVENTION

The present invention provides a new process for producing thin films which are adapted to eliminate the aforestated shortcomings inherent in the conventional technology and causes no thermal decomposition of optical materials, making it possible to produce, with greater efficiency and at lower temperatures, composite optical thin films which offer a high-degree of microstructural control capabilities and higher functions.

As means to solve the foregoing problems, the present invention also provides a process for fabricating thin films, such process including the steps of dissolving each of the desired thin film materials into a state of solution or dispersion, spraying the resulting product from each of spray nozzles provided for each of the materials into a high-vacuum vessel and allowing the same to deposit on a substrate, ready for heating.

Furthermore, the instant invention also provides the foregoing method for fabricating thin films wherein, following the aforementioned heating process, the thin films are put further to a pressure forming process.

The method of the present invention may be carried out by a device for producing thin films and including a vacuum vessel, a spray means whereby desired thin film materials, dissolved into a solution or a dispersion, are sprayed for each component thereof into the vacuum vessel, a substrate on which the thin film materials sprayed into the vacuum vessel are deposited, a heating means for heating the substrate, and an exhaust means of the vacuum vessel. More specifically, the instant invention provides a process for producing composite optical thin films and a device therefore, such process comprising the steps of spraying organic optical materials, dissolved in a solution or dispersion, with more than two components from a spray nozzle provided for each component of the material into a vacuum vessel and depositing the same onto a substrate for heating.

In the production of thin films by the process for preparing optical thin films, organic high polymer compounds, organic low molecular weight compounds, organic compound particulates and liquid crystal compounds can be dissolved into a solution or a dispersion for use. The process according to the present invention includes dissolving organic optical materials of more than two components into a solution or a dispersion, and spraying the same from the spray nozzles provided for each component of the material into a high-vacuum vessel. This permits the selective use of the optimum solvent or dispersive medium for each component, and furthermore, the optimum setting of the concentrations of a solution or a dispersion for each component.

DETAILED DESCRIPTION OF THE INVENTION

As described above, the present invention provides a process for producing thin films, comprising the steps of spraying a single or multiple thin film materials, dissolved in a solution or a dispersion, from a spray nozzle provided for each component of the material into a high vacuum vessel, allowing them to deposit on a substrate and heating the resulting product. Further details of the process and device according to the present invention will be given below.

There are no specific limitations on the kinds of the thin film materials to be employed by the present invention. Organic or inorganic materials, or any given combination thereof is acceptable.

Organic materials which can be used by the present invention include scores of polymers and other high molecular compounds, or low molecular weight liquid crystal compounds, and coloring matter compounds. Inorganic compounds include semiconductors, electrical conductors, transparent conductors, refraction factor-variable ceramics and glass and various other substances.

Composite optical thin films can be combined in various ways. Specific examples of combinations or organic optical materials include combinations or organic high molecular compounds and organic low molecular weight compounds, combinations of organic high molecular compounds and liquid crystals, combinations of two or more kinds of organic high molecular compounds, and combinations of mixtures of organic high molecular compounds and low molecular weight compounds with high molecular compounds. Individual components used in these combinations are those soluble in volatile solvents, or any type of components capable of being dispersed in a dispersion medium. The individual components may be either ones that themselves offer optical functions, or ones that are mixed or formed into a composite that possesses such functions. As required, they can be mixed with selenium, tollurium, germanium, silicon, silicon carbide, cadmium sulfide, cadmium selenide, Cd- Zn-Mn-Se-Te-S-O and Ga-In-Al-As-P, and other semiconductor particulates, and gold coloid and other metal particulates.

Particulates of organic high molecular compounds, organic low molecular weight compounds, and organic compounds, as well as liquid crystals can be dissolved into a solution or a dispersion. In spraying the organic optical compounds of more than two components, dissolved in a solution or a dispersion, from a spray nozzle for each component of the material into a high vacuum pressure vessel, it is possible to select the optimum solvent or dispersive medium for each component. It is also possible to set the concentration of the solvent or the dispersion to an optimum value for each component.

Below, the individual components will be illustrated in more detail.

Organic High Molecular Compounds

Among the organic high molecular compounds, those having "optical properties and functions" can be utilized as one component of the materials for composite optical thin films according to the instant invention.

Examples of such organic high molecular compounds include: polystyrene, poly(α-methylstyrene, polyindene, poly(4-methyl-1-pentene), polyvinylpyridine, polyvinyl alcohol, polyvinyl acetal, polyvinyl butyral, polyvinyl acetate, polyvinyl chloride, polyvinylidene, polyvinyl methylether, polyvinylethylether, polyvinyl benzilether, polyvinyl methylketone, poly(N-vinyl-carbazole), poly(N-vinylpyrolidone), polymethyl acrylate, polymethyl methacrylate, polyethyl methacrylate, polybutyl methacrylate, poly benzyl methacrylate, polycyclohexyl methacrylate, polymethacrylate, polymethacrylic amide, polymethacrylonitrile, polyacetaldehyde, polychloral, polyethylene oxide, polypropylene oxide, polyethylene terephthalate, polybutylen terephthlate, polycarbonate (bisphenol carbonic acid), poly(diethyleneglycol-bisallyl carbonate), 6-nylon, 6, 6-nylon, 12-nylon, 6, 12 nylon, polyasparitic acid ethyl, polyglutamic acid ethyl, polylysine, polyproline, poly(r-benzyl-L-glutamate), methyl cellulose, ethyl cellulose, benzyl cellulose, hydroxyethyl cellulose, hydroxypropyl cellulose, acetyl cellulose, cellulose triacetate, cellulose tributylate, alkyd resin (phthalic anhydrido+glycerine), fatty acid denaturation alkyd resin (fatty acid+phtalic anhydride+glycerine), unsaturated polyester resin (maleic anhydride+phtalic anhydride+ propyleneglycol), polyurethane resin, phenol aldehyde resin, urea-form-aldehyde-resin, molamine resin, xylene resin, toluene resin, guanamine resin and other resins, poly (phenyl-methylsilane) and other organic polysilane, organic polygermane and their copolymerizate and copolycondansate, and carbon disulfide, carbon fluoride, ethylbenzene, perfluorobenzen, perfluorocyclohexane, trimethyl-chlorosilane and other high molecular compounds obtained by putting to plasma polymerization the compounds which normally have no polymeizing property.

These organic high molecular compounds may contain the residual groups of organic coloring matter and the organic low molecular compounds showing optical non-linear effect as a monomeric-unit side chain, or a crosslinking group, copolymer monomeric unit or a polymerization initiation end group.

Organic Low Molecular Weight Compounds

Specific examples of organic low molecular weight compounds, one component of the materials for composite optical thin films according to the instant invention, include: urea and the derivatives thereof, m-nitroaniline, 2-methyl-4-nitroaniline, 2-(N, N-dimothylamino)-5-nitroacotanilide derivatives, N,N'-bis(4-nitrohenyl)methandiamine and other benzene derivatives, 4-methoxi-4'-nitrobiphenyl and other biphenyl derivatives, 4-methoxi-4'-ntrostilbene and other stilbene derivatives, 4-nitro-3-picolin=-N-oxide, (S)-(−)-N (5-nitro 2 pyridil)-prolynol and other pyridine derivatives, 2', 4,4'-trimethoxychalcone, and other chalcone derivatives, tienilechalcon derivatives, and other secondary non-linear optical active materials, as well as various organic coloring matter and organic pigments.

Liquid Crystal

Specific examples of liquid crystal materials used as one component of the materials for composite optical thin films according to the instant invention include: a variety of cholesterol derivatives, 4'-n-butoxybenzylidene-4-cyanoaniline, 4'-n-hexylbenzylidene-4-cyanoaniline and other 4'-alkoxybenzylidene-4-cyanoaniline, 4'-ethoxybenzylidene-4-n-butylaniline, 4'-methoxybenzylidene aminoazobenzene, 4-(4'-methoxybenzylidene)aminobiphenyl, 4-(4'-methoxybenzylidene)aminostilben and other 4'-alchoxybenzylideneanilines, 4'-cyanobenzylidene-4-butoxyaniline, 4'-cyanobenzylidene-4-n-butoxyaniline, 4'-cyanobenzylidene-4-n-hexyloxyaniline and other 4-cyanobenzylidene-4-alchoxyanilines, 4'-n-butoxycarbonyl-oxybenzylidene-4-methoxyaniline, p-carboxyphenyl-n-amylcarbonate, n-heptyl-4-(4-ethoxyphenoxylcarbonyl)phenylcarbonate and other carbonic esters, 4-n-butyl- benzoic acid 4'-ethoxyphenyl, 4-n-butylbenzonic acid, 4'-octyloxyphenyl, and other 4-alkylbenzonic acid 4'-alcoxyphenylester, 4,4'-di-n-amyl-oxyazoxybenzene, 4,4'-di-n-nonyloxyazoxybenzene and other azoxybenzene derivatives, 4-cyano-4'-n-octylbiphenyl, 4-cyano-4'-n- dodecylbuphenyl and 4-cyano-4'-akylbiphenyl and other liquid crystals, and (2S, 3S)-3-methyl-2-chloropentanoic acid 4', 4'octyloxybiphenyl, 4'-(2-methylbutyl)biphenyl-4-carboxylic acid 4-hexyloxyphenyl, and 4'-octylbiphenyl-4-carboxyicacid4-(2-methylbutyl)phenyl and other ferroelectric liquid crystals.

For instance, the organic high molecular materials, organic low molecular materials, and liquid crystal substances illustrated above are sprayed into a high vacuum vessel with each component thereof for composite use dissolved in a solvent or dispersed in a dispersion medium.

There are various kinds of these solvents and dispersion media that can be employed for that purpose. These may be of any type as long as they dissolve or disperse individual components in the foregoing composite optical thin films, are volatile and not corrosive. More specifically, they include: methanol, ethanol, isopropyl alcohol, n-butanol, amyl alcohol, cyclohexanol, benzyl alcohol and other alcohols, ethylene glycol, diethylene glycol, glycerin and other polyhydric alcohols, ethyl acetate, n-butyl acetate, amyl acetate, isopropyl acetate, and other esters, aceton, methylethylketone, methylisobutylketone, cyclohexanon and other ketons, dietylether, dibutylether, methoxyethanol, ethoxy ethanol, butoxyethanol, Carbitol and other ethers, dichloromethane, chloroform, carbon tetrachloride, 1,2-dichloroethane, 1,1,2-trichloroethane, trichlene and other halogenated hydrocarbons, benzene, toluene, xylene, chlorobenzene, o-dichlorobenzene, nitrobenzene, anisole, a-chloronaphtalene and other aromatic hydrocarbons, n-pentane, n-hexane, n-heptane, cyclohexane and other aliphatic hydrocarbons, N,N-dimethylformamide, N,N-dimethyl acetamide, hexamethylphosphoric triamide and other amides, N-methyl-pyrolidon, and other cyclic amides, tetramethylurea, 1,3-dimethyl-2-imidazolidinon, and other urea derivatives, dimethylsulfoxide and other sulfoxides, ethylene carbonate, propylene carbonate and other carbonic esters, acetonitrile, propionitrile, benzonitrile and other nitriles, pyridine, quinoline and other nitrogen-containing heterocyclic compounds, triethylamine, triethanolamine, diethylamyl-alcohol, aniline and other amines, as well as water, nitromethane, carbon disulfide, sulfolane and other solvents.

These solvents may be mixed with other kinds of solvents.

According to the present invention, dissolved or dispersed in the foregoing solvents or dispersion media, thin film materials with more than two components are sprayed from a spray nozzle provided for each component into a high vacuum vessel and allowed to deposit on a substrate, and then are subjected to heating. As dissolved by one embodiment of the present invention, the adoption of the following device and the operation process therefore permits the formation of composite optical thin films.

Figure 1:
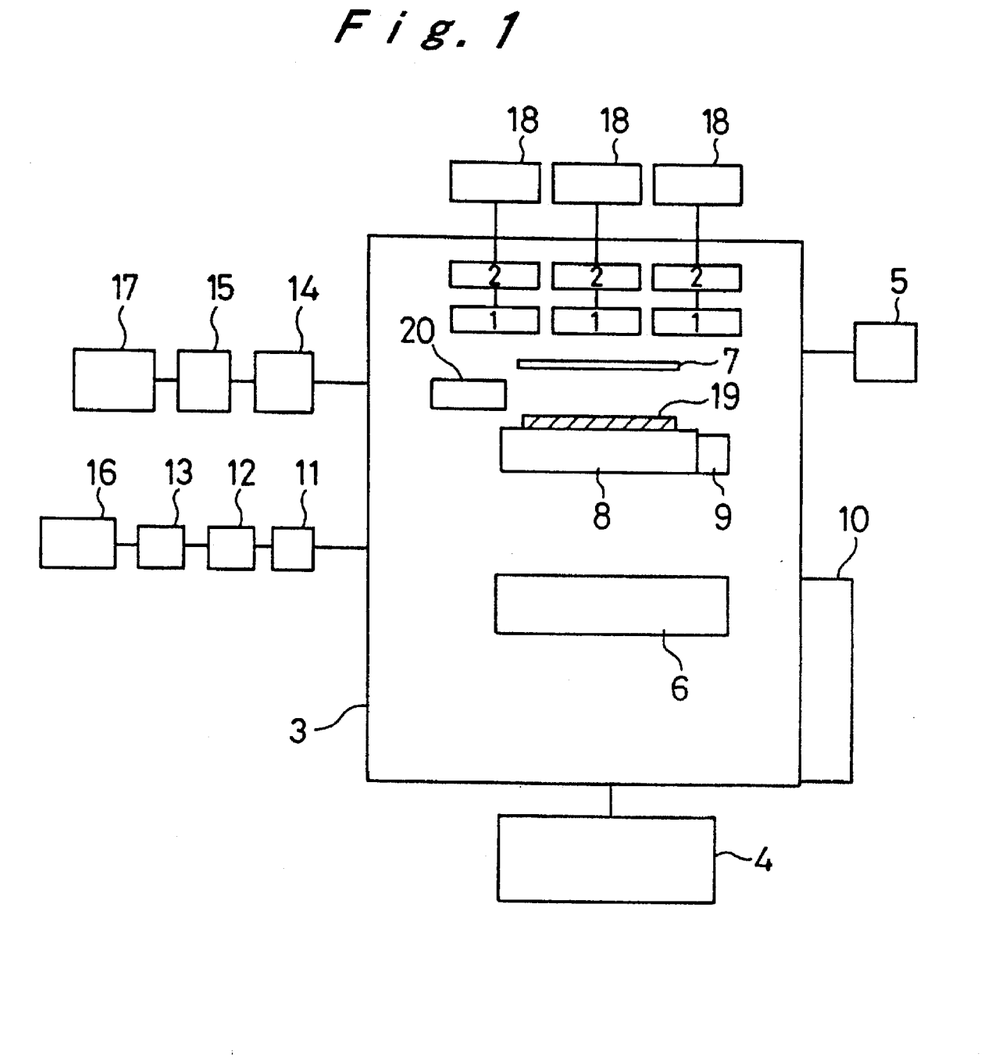
FIG. 1 is a block diagram illustrating the structure of a device according to the instant invention.

A device for producing thin films according to the present invention may be embodied as depicted in FIG. 1. Take an example where organic materials are used. The device according to the present invention disposes two or more spray nozzles (1) as means for spraying a solution or a dispersive medium of the desired organic material into a vacuum having a pressure of $1 \times 10^{-4}$ Pa. or less and a selector mechanism (2) for individual spray nozzles in a vacuum vessel (3), and a vacuum pump (4) adapted to rapidly exhaust the vapor of solvents which are volatilized in the vacuum vessel (3) to maintain the pressure in the vacuum vessel (3) at $1 \times 10^{-4}$ Pa or less.

This device is also provided with a pressure measuring device (5), a cold trap (6) for preventing the vapor of solvents volatilizing in the vacuum vessel (3) from reaching the vacuum pump (4), a shutter (7) for screening between the spray nozzles (1) and a substrate (19), a substrate heating device (8), and a substrate temperature measuring device (9). This device is designed to form a thin film onto substrate (19) in the vacuum vessel (3).

This device is also provided, as required, with a baking unit (10) for the vacuum vessel (3), a gate valve (11), an ionization device (12), a mass spectrograph (13), a substrate introducing device (14), a manipulator (15) and the controllers thereof.

The vacuum pump (4) may be of any type as long as it can exhaust the gases in the vacuum vessel (3) at the maximum possible speed, reducing the pressure therein from atmospheric pressure to a high vacuum as quickly as possible, more preferably, a pressure of $1 \times 10^{-4}$ Pa of less, and quickly exhaust the gaseous components of solvents which have been volatilized in the vacuum vessel and have escaped the cold trap (6), capable of maintaining the in-vacuum vessel (3) pressure at $1 \times 10^{-4}$ Pa or less. Specifically, a combination of a turbo-molecular pump and a rotary pump, or a combination of an oil diffusion pump and a rotary pump may be employed.

As illustrated in FIG. 1, wherein the vacuum vessel (3) contains an ionization unit (12), a mass spectrograph (13), and a substrate introducing device (14), it is desirable to connect vacuum pumps (18)(17) of another system.

The pressure measuring unit (5) may be of any type publicly known as long as it can provide accurate measurements of pressures of $1 \times 10^{-4}$ Pa or less. For example, Bayard-Alpert model or other ionization vacuum gauge, diaphragm total vacuum gauge may be used.

Vacuum vessels (3) are preferably of the configuration in which the component parts of the device are arranged so that the vacuum system-volume is minimized. Materials are preferably aluminum or stainless in accordance with high vacuum specifications. Substrate heating unit (9) is preferred to be one in which a mechanism is contained to control substrate temperatures to a desired value. Either of the types in which the heater portion is placed in a vacuum system or the ones in which heating is effected from outside the vacuum system may be acceptable, depending on the configuration of substrate (19).

The substrate temperature measuring unit (9) is intended to measure the temperature of substrate (19), and may be of any type if it operates with a thermocouple or other temperature element placed under high vacuum conditions.

The baking unit (10) is preferably one which can heat all the parts and components comprising a vacuum system, and coloid trap (6) may be of any type if it securely traps the vapor of solvents volatilized in a high vacuum vessel and does not block exhaust gasses therefrom.

The ionization unit (12) and the mass spectrograph (13) are not essential elements, but they are useful in confirming that the volatile components generating from the deposits on substrate (19) have been completely eliminated.

Designed as a means which can timely screen between the ionization unit (12) and the mass spectrograph (13) and the vacuum vessel (3), gate valve (11) is not necessarily required. It is useful, however, to prevent the components and solvents sprayed in a vacuum system from spattering about and smudging mass spectrograph (13). When gate valve (11) is provided, it is desirable to connect another system vacuum pump in the vacuum vessel (3) and the mass spectrograph (13).

Ionization unit (12) may be of any known type if configured to ionize the volatile components present in the vacuum system. In particular, ionization units, be they gas-discharge, arc-discharge, or electron-impact type, may be employed.

The mass spectrograph (13) may be any one publicly known if it consists of a portion separating the mass of an ion according to the number, m/e, obtained by dividing the mass m by the electrode a of that ion (mass separating system), and a portion electrically counting the number of ions separated according to m/e (detection recording system). The mass separation system controls a magnetic field and/or an electric field and separates ions according to m/e, and any of the parabola type, velocity focusing type, directional focusing type, double focusing type and time-of-flight type may be selected. The detection recording system may be a combination of a Faraday box and a high-sensitive DC amplifier, or a combination of a secondary electron multiplier and a high-sensitive DC amplifier.

The substrate introducing unit (14) is not necessarily required, but it is useful in reducing the exhaust time when a substrate is installed in a vacuum vessel (3). The substrate introducing unit (14) comprises a vacuum vessel, a cover or a gate valve for introducing a substrate (19) from outside, a magnetic coupling or bellows-type linear induction unit, a gate valve between the vacuum vessel (3) and the unit itself, a vacuum pump (17) and a vacuum gage.

The manipulator (15) is not necessarily an essentially element, but it is useful in fine-adjusting the location and orientation of substrate (19) with respect to spray nozzles (1).

The spray nozzles (1) for spraying a solution or dispersive medium of material into the vacuum vessel are particularly important elements of the device for producing composite optical thin films according to the instant invention. In order to prevent the liquid sprayed from the spray nozzles (1) from solidifying at the spray nozzles and clogging the nozzles, and, further, in order to control the amount of the solution or the dispersive medium to be sprayed, a nozzle on-off mechanism is required.

As a mechanism to overcome the problem of clogged nozzles, a wiper may be used which is operated from outside the vacuum system, but it is obviously less than satisfactory in terms of operability and effectiveness.

Figure 2:
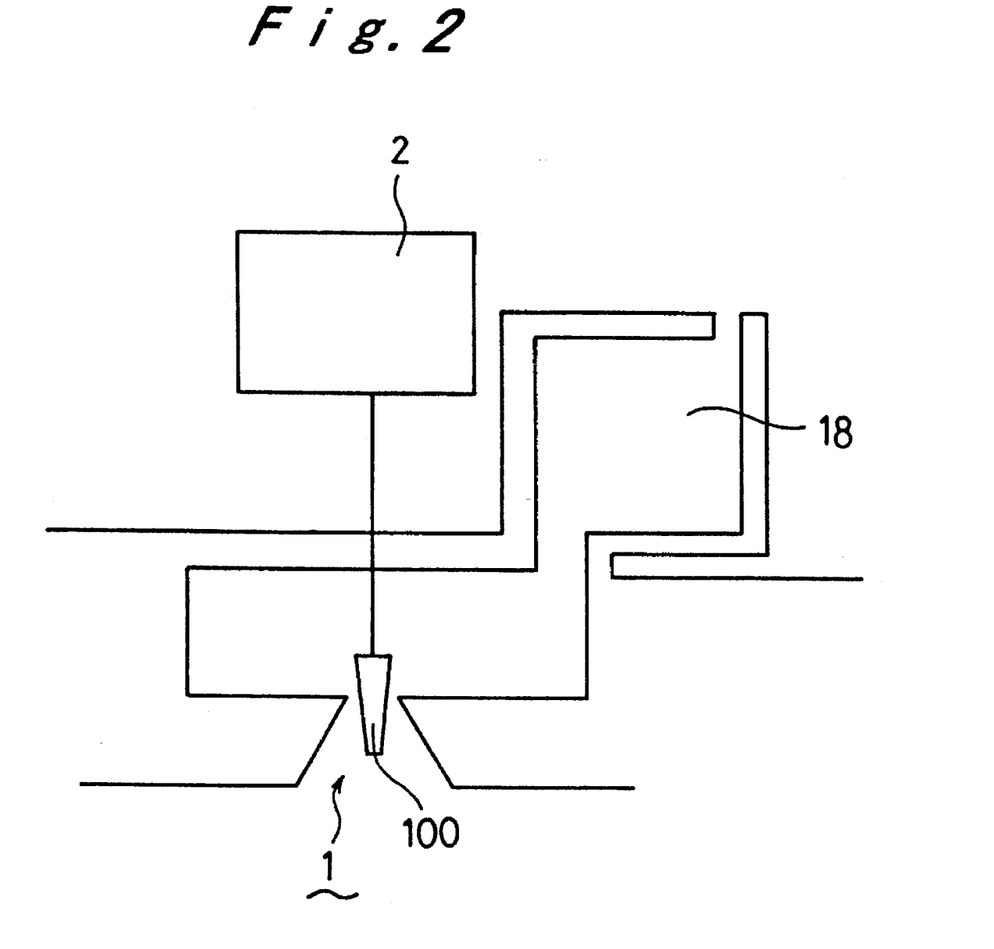
FIG. 2 is a schematic cross sectional view illustrating a spray nozzle and a nozzle on-off mechanism.

One example of the spray nozzles (1) for the device according to the instant invention may be a needle valve with high machining accuracy, as illustrated in FIG. 2.

Each spray nozzles (1) is provided with a needle valve (100), which is operated by means of a nozzle on-off mechanism (2) to regulate a solution or dispersive medium of material from the spray nozzle (1), thereby making it possible to prevent is from being clogged.

A solution or dispersive medium of thin film materials is supplied from a respective liquid sump (18) to the respective spray nozzle (1).

In the execution of the process of the present invention which comprises the steps of dissolving organic optical materials of two or more components into a solution or a dispersion medium, spraying each component thereof from the spray nozzles into a high vacuum vessel and allowing it to deposit on a substrate for heating, two or more combinations of the spray nozzles (1), the nozzle on-off mechanism (2) and the liquid sumps (18) are provided depending on the number of components for the thin film materials for the organic optical materials to be used. For instance, in FIG. 1, three sets of the spray nozzles (1), nozzle on-off mechanisms (2) and liquid sumps (18) are illustrated.

A solution or a dispersion medium of one component of a thin film material may be divided and sprayed by means of two sets or more of the spray nozzles (1) and the nozzle on-off mechanisms (2).

The procedures for operating the device in the preparation of composite optical thin films will be described. Such procedures include the steps of: filling a first component, for instance, a solution of high molecular compound, in one of the liquid sumps (18) of the device as illustrated in FIG. 1, and a second component, for example, a solution of organic coloring matter, in another liquid sump, spraying these solutions into vacuum vessel (3) while controlling the spray amount for each component of the material by means of respective nozzle on-off mechanisms (2) corresponding to each of said liquid sumps, thereby depositing a thin film of composite optical materials of, for instance, two components, on the substrate (19).

The substrate is heated to a temperature not higher than that at which the deposited substances start to decompose by heating, to remove the volatile components, and as required, is subjected to the application of heat and/or pressure, and to form a thin film having the desired structure and thickness.

According to the present invention, there is no limitation in the kinds of substrate materials to be used: glass, quartz, ceramics, silicon and high molecular film and any other type may be employed. Heating the deposit on the substrate (19) may be accomplished either by heating the substrate (19) itself, or by heating the deposit with a substrate surface heating unit (20) as illustrated in FIG. 1.

One such surface heating unit (20) may be an electric heater, an infrared radiation system or any other appropriate means.

For the application of pressure for forming of thin films, a publicly known means may be used a hot rolling process (for instance, Japanese Patent Publication No. 88609/92).

Figure 3:
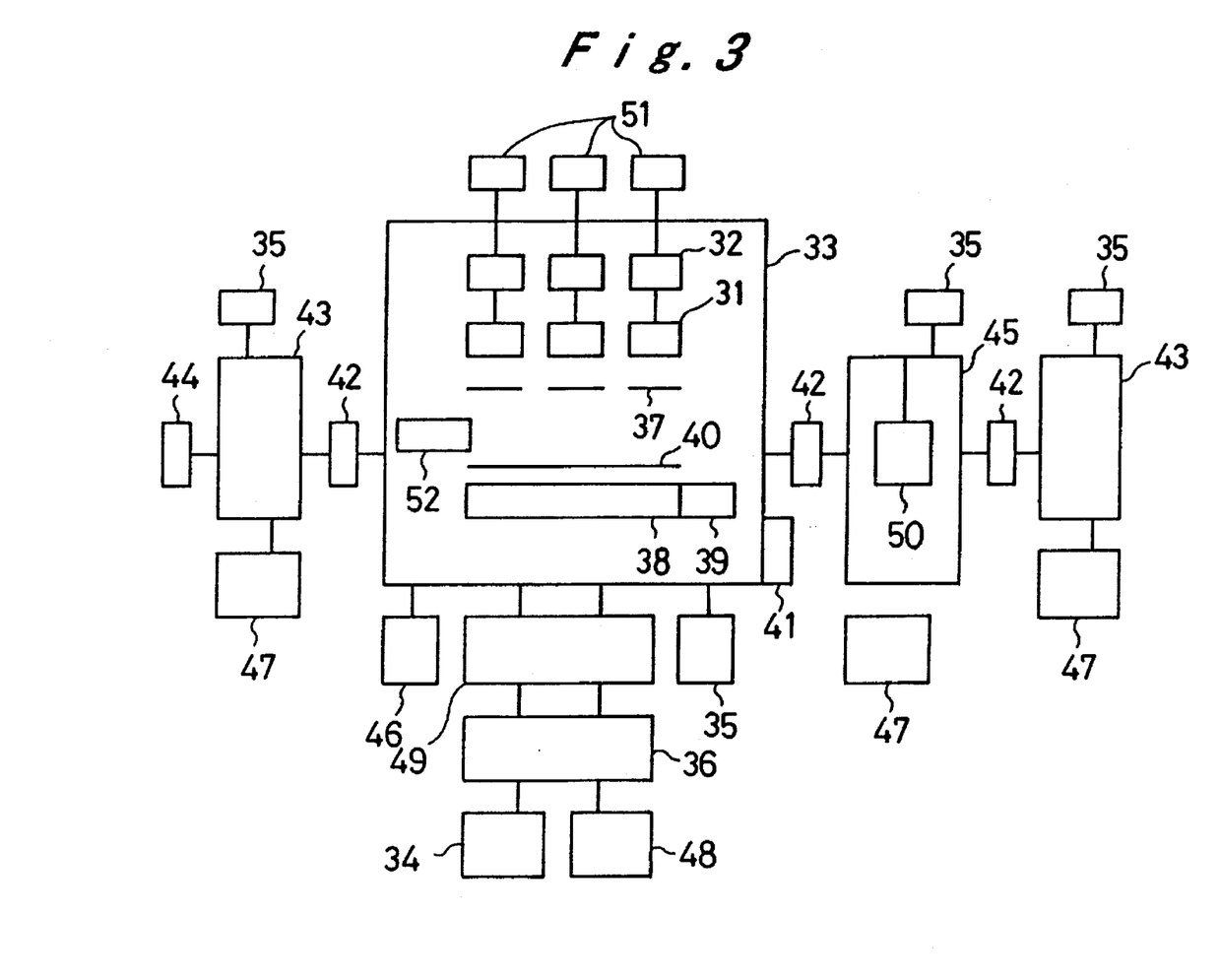
FIG. 3 is a block diagram illustrating another embodiment of the structure of a device according to the instant invention.

The device for producing thin films according to the present invention may be in accordance with a variant which has a structure as indicated in FIG. 3.

In this embodiment, for example, as a means to spray a solution or a dispersion of organic or inorganic thin film materials into a vacuum condition where the pressure is $1 \times 10^{-4}$ Pa or below, more than two spray nozzles (31) and jogging mechanisms (32) for the individual nozzles are contained in a vacuum vessel (33). A vacuum exhaust unit (34) is provided in which the vapor of solvents volatilizing in this vacuum vessel (33) is quickly exhausted to maintain the pressure therein at $1 \times 10^{-4}$ pa or below.

The device according to the present invention also comprises a pressure measuring unit (35), an exhaust trapping unit (36) for preventing the vapor of solvents volatilized in the vacuum vessel (33) from reaching the vacuum exhaust unit (34), a shutter (37) screening between spray nozzles (31) and a substrate (40), a substrate heating unit (38), and a substrate temperature measuring unit (39), so that a thin film can be formed on the surface of the substrate (40) in the vacuum vessel (33).

The device for fabricating thin films according to the present invention may be provided with a baking unit (41) for the vacuum vessel (33), a gate valve (42), a substrate introducing unit (43), a manipulator (44), a vacuum heating unit (45) and controllers therefor.

The vacuum exhaust unit (34) may be of any given type if designed to exhaust gases in the vacuum vessel at the maximum possible speed from atmospheric pressure to a high vacuum, more preferably, to a pressure below $1 \times 10^{-4}$ Pa, quickly exhausting the solvents or other gaseous components that have been volatilized and left uncaptured in the exhaust trapping unit (36), and can maintain the pressure inside the vacuum vessel (33) at $1 \times 10^{-4}$ Pa or below. Specifically, a combination of a turbo molecular pump and a rotary pump or a combination of an oil diffusion pump and a rotary pump may be usable.

The pressure measuring unit (35) may be of any type publicly known, if it can provide accurate measurements of pressures of $1 \times 10^{-4}$ Pa or below in normal applications. Specifically, Bayard-Alpert type ionization gauge may be among such units.

The vacuum vessel (33) is preferably such configuration wherein the components of the device are arranged so that the volume of the vacuum system may be minimum, with the material being preferred to be of aluminum or stainless steel of high vacuum specifications. The substrate heating unit (38) may be either the type in which the heater portion is placed inside the vacuum system or the type in which heating is effected from outside the vacuum system. Any type may be employed depending on the configurations of the substrate (40). The substrate heating unit (38) is preferred to be one containing a mechanism that can control substrate temperatures to a specified value. The substrate temperature measuring unit (39) is designed to measure the temperature of the substrate, and may be of any type as long as a thermocouple and other temperature sensing element is placed under a high vacuum condition.

The baking unit (41) is preferably one that can heat all the components of the vacuum system. The exhaust trapping unit (36) may be of any type if designed to securely trap the vapor of the solvents volatilized in the high vacuum vessel, not to obstruct the exhaust operation, and to be readily regenerative in a short period of time. For instance, liquid nitrogen-cooling, refrigerant circulation from a refrigerator or active charcoal may be employed, all of which are attached with a regeneration unit that removes the trapped solvents through thermal desorption. The exhaust trapping unit (36) is available in multiple systems selected by means of a selector valve for alternative use, making continuous production of thin films possible. This means that it is possible to remove the trapped solvents from one system through thermal desorption while the another system is operating.

Figure 4A:
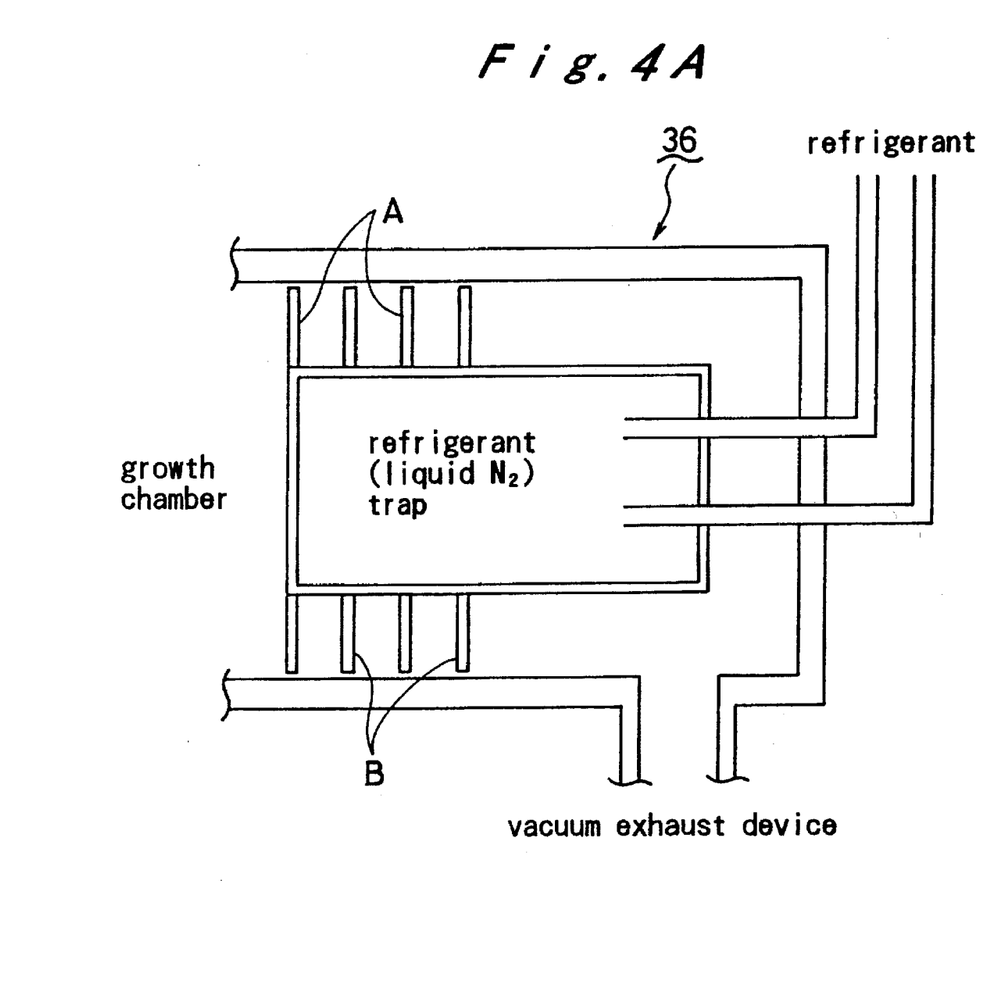
FIGS. 4A and 4B are cross sectional views illustrating an example of an exhaust trapping device.
Figure 4B:
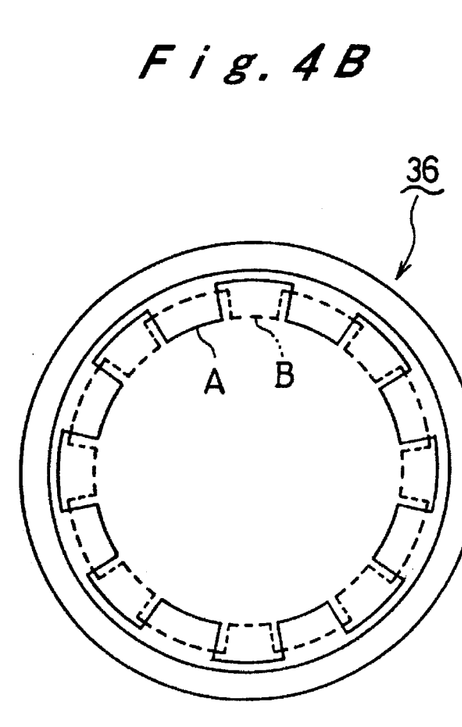

FIG. 4 shows an example of the exhaust trapping unit (36). It contains a means for stopping the refrigerant from circulating, has a plurality of fins A and fins B disposed on the outer circumference, with notches therein arranged alternately in the direction of the central axis so that one cannot see ahead from the side of the exhaust trapping unit (36) to the side of a growth chamber.

For instance, a clearance between fins A and fins B on one part and the wall of the exhaust vessel on the other may be in the order of 1 mm for adiabatic effect.

Such exhaust trapping unit (36) is important to the device according to the present invention.

It is obvious enough that in place of cooling by use of a refrigerant, various physical trapping means can be employed.

The substrate introducing unit (43) is required to reduce the exhaust time of the vacuum vessel (33) in mounting and removing a substrate into and out of the vacuum vessel (33). Substrate introducing unit (43) comprises a vacuum vessel, a cover used when the substrate (40) is introduced from outside, manipulator (44) that consists of a magnetic coupling or bellows-type linear introducing machine, gate valve (42) disposed to screen against the vacuum vessel (33), vacuum exhaust unit (47) and vacuum gage (35).

The manipulator (44) is required to fine adjust the location and orientation of the substrate (40) with respect to the spray nozzles (31).

The vacuum heating unit (45) is divided by means of a gate valve (42), and therein lies a heat/pressure application unit (50) for applying heat and pressure to thin films transported with the manipulator (44). A hot rolling unit can be used for that purpose as shown in (Japanese Patent Publication No. 99609/92.) Vacuum heating vessel (45) is subject to vacuum exhaust and measured with pressure measuring unit (35).

The spray nozzles (31) for spraying a solution or a dispersion of materials into a vacuum vessel are particularly important elements in the device for producing thin films according to the instant invention. To prevent the liquid from the spray nozzles from solidifying at the nozzle and clogging the same and to control the amount of spray, it is required to provide a nozzle jogging unit. One example of the structure of spray nozzles (31) may be a needle valve with high machining precision, as illustrated in FIG. 2 above. Each spray nozzle is provided with a needle valve (100) which is actuated with a respective nozzle jogging mechanism (2) to adjust the amount of spray of a material solution or a dispersion from the spray nozzle and to prevent it from becoming clogged. A solution or a dispersion of organic optical materials are supplied from liquid sumps (51) to the spray nozzles (31).

In order to spray organic optical materials of more than two components, dissolved in solutions or dispersions from the spray nozzles into a high vacuum vessel and allow them to deposit on a substrate, ready for a heating process, spray nozzles (31), a set of nozzle jogging mechanisms (32) and liquid sumps (51) must be available in two or more systems, depending on the number of components of organic optical materials to be used. In the example shown in FIG. 3, as in the case of the device depicted in FIG. 1, three sets of spray nozzles (31), nozzle jogging mechanisms (32) and liquid sumps (51) are illustrated.

In operation, the vacuum vessel (33) of the device for producing thin films as indicated in FIG. 3 is put to thorough exhaust with the vacuum exhaust device (34), then, a pressure gauge (35) is used to confirm that the vapor in the vacuum system has been exhausted to a pressure at which the system should reach. Also with the pressure gauge (35), the nozzle jogging mechanisms (32) are adjusted while observing the amount of solution being sprayed. One of the liquid sumps (51) is filled with a first component, for instance a solution of high molecular compounds, and the other with a second component, e.g. a solution of organic coloring matter. The nozzle jogging mechanisms (32) corresponding to each of the liquid sumps are employed to spray the solution through the spray nozzles (31) into the vacuum vessel (33) while controlling the amount of spray of each component. The solvent or dispersion medium is allowed to be subject to vacuum evaporation, and, simultaneously, a thin film of organic optical materials made up of, for example, two components, is deposited on the substrate (40).

According to the present invention, substrate heating unit (38) and surface heating unit (52) are used to heat substrate (40) to a temperature not higher than the temperature at which the deposit starts thermal decomposition, removing the volatile components. As required, gate valve (42) is opened, to transfer the substrate into vacuum heating unit (45) using manipulator (44), vacuum exhaust unit (47) is used to exhaust the vapor therein, pressure gauge (44) is employed to check the pressure therein, then heating/pressuring unit (50) is used to apply heat and/or pressure to the deposit on the substrate to form the same into a desired product.

In the present invention, there is no special restriction on the material of substrate (40); it may be glass, quarts, ceramics, silicon, or high molecular films. Heating a deposit on the substrate (40) may be accomplished by directly heating the substrate or by using substrate surface heating unit (52). Such surface heating unit (52) may be an electric heater, an infrared radiation system or other appropriate device.

More detailed examples of the invention now will be described.

EXAMPLE 1

Using the thin film-producing device in accordance with the instant invention whose structure has been illustrated in FIG. 1 above, an optical thin film was produced. As an example or organic coloring matter, iodized 3, 3'-diethyloxadicarboxyanine iodide (hereinafter DODCI), manufactured by Exinton of the United States, was used. DODCI shows no fusing point, decomposes at about 230° C. when heated at a rate of 10° C./min. under nitrogen atmosphere, and does not exhibit any sublimation even when heated to 150° C. under a high vacuum conditions of $10^{-5}$ Pa.

In this embodiment as examples of high molecular compounds, poly(methyl methacrylate) (hereinafter referred to as PMMA), poly(2-hydroxypropyl methacrylate) (hereinafter PHPMA), and polycarbonate (hereinafter PC), produced by Andrich of the United States, were used.

As a substrate, a cover glass (18 mm square and 150±μ thick) or a quarts plate (20 mm square and 1000±2 μm thick), for instance, was employed.

DODCI, one of the components used, was dissolved in acetone having a concentration of 10 mg/litter, and filled into one of the liquid sumps (18). PMMA, another component, was dissolved in acetone at a concentration of 1 g/litter, and filled in the another sump (18). These solutions were sprayed simultaneously through their respective spray nozzles into vacuum vessel (3). During the spraying process, the pressure in the vacuum vessel (3) was maintained at $10^{-4}$ Pa or below using a turbo molecular pump, a rotary pump, and a liquefied nitrogen-cooled cold trap. By adjusting the open-close intervals nozzle on-off mechanisms (2), with the spraying rates controlled to 3333 microlitter/min. for the DODCI solution and to 100 microlitter/min. for the PMMA solution, the spraying process was continued for 100 minutes. While the spraying operation was in progress, the temperature of the substrate (19) was maintained at 40±2° C. by means of substrate heating unit (8) and substrate temperature measuring unit (9). The resultant DODCI-containing PMMA thin film deposited on the substrate (19) was put to a hot press method and was heated to 150° C., and then subjected to pressure under a static pressure of 4.9 MPa to provide an optically transparent thin film. The concentration of the DODCI in this optical thin film is expressed in weight percent in Table 1.

Measurement of the X-ray diffraction of this optical thin film revealed no clear diffraction line. Then, the particle size of DODCI in this thin film was measured using X-ray small angle scattering. Results are listed in Table 1 below. When this thin film was excited with a light having a wavelength of 590 nm and the emission (fluorescent light) was measured using a commercially available fluorophotomotor, the maximum wavelength of the emission was as indicated in Table 1 below.

TABLE 1

| Example No. | DODCI Solution spray rate [μL/min] | DODCI concentration (in optical thin layer) [weight %] | DODCI particle size [nm] | Maximum wavelength of emission (excited at 500 nm) [nm] |
| --- | --- | --- | --- | --- |
| 1 | 3333 | 25 | 66 | 615 and 720 |
| 2 | 1111 | 10 | 67 | 614 and 720 |
| 3 | 526 | 5 | 65 | 615 and 719 |
| 4 | 256 | 2.5 | 54 | 615 and 718 |
| 5 | 101 | 1.0 | 48 | 612 |
| 6 | 50 | 0.5 | 40 | 615 |
| 7 | 25 | 0.25 | 30 | 613 |
| 8 | 10 | 0.10 | 15 | 609 |
| 9 | 5 | 0.05 | 4 | 600 |
| 10 | 2.5 | 0.025 | 5 | 599 |

EXAMPLES 2 TO 10

Except that the spray rates of DODCI solution were varied as indicated in Table 1, by the same procedure as in Example 1, optical thin films were produced. The concentration of DODCI in these optical thin films, the measurements of DODCI particle size by the X-ray small angle scattering method, and the maximum wave-lengths of emissions excited with a light having a wavelength of 590 nm are indicated in Table 1 above. These results indicate that by the process according to the instant invention, it is possible to control the particle size of the coloring matter (DODCI) in the optical thin film in the range of several tens of nanometers.

COMPARISON 1

DODCI and PMMA were dissolved at a rate of 50 mg and 850 mg per 1 litter of acetone in separate solutions. The solutions were coated on object glass by the spin coating method. By controlling the number of coating applications, a composite thin film of DODCI/PMMA with film thickness of 0.1 μm and 10 μm was produced. The concentration of DODCI of this film was determined to be 5 weight %, indicating that the film proves comparable to that of Embodiment 3 above in terms of coloring matter concentration.

An optical microscopic observation of this 0.1 μm-thick film showed a precipitation of blue crystalline product. When the 10 μm-thick film was measured by X-ray diffraction, a diffraction line identifying the crystal growth of DODCI. Preparation of a thin film with a DODCI concentration of 5 weight % by the coating method revealed that the crystal growth of DODCI could not be controlled, causing it to precipitate as coarse particles.

EXAMPLE 11

Figure 5:
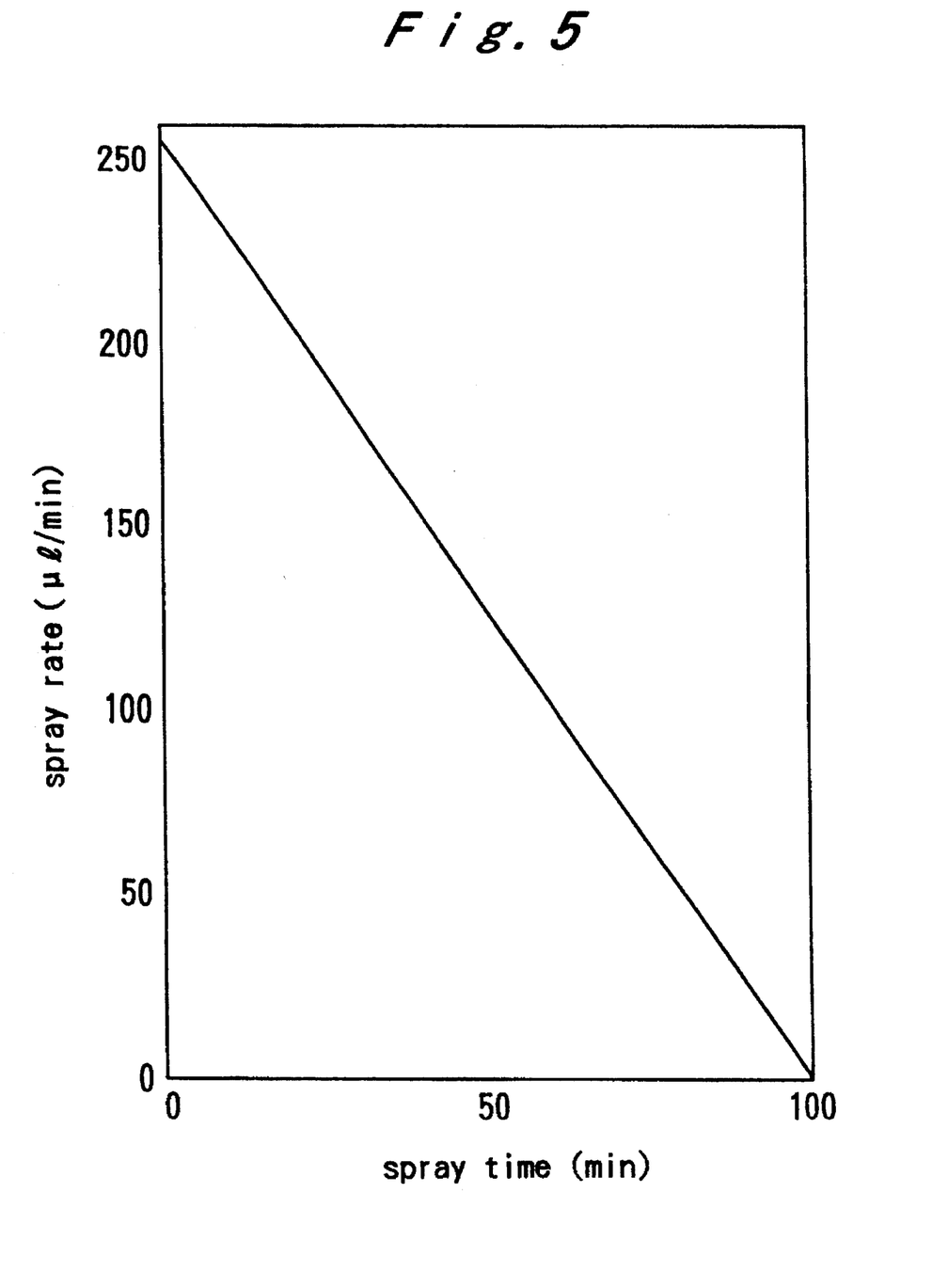
FIG. 5 is a graph showing a correlation between spraying rates of a DODCI solution as a function of time.

The spray rate of a DODCI solution was, as illustrated in FIG. 5, decreased continuously in proportion to time. At the onset of the spraying operation it was set at 256 microlitter/min. and was reduced to zero at 100 minutes thereafter. In the same manner as in Embodiment 1 except that the concentrations of DODCI in a thin film deposited on a substrate were continuously varied, optical thin films in which concentrations of DODCI were continuously varied in a direction vertical thereto (hereinafter "direction of depth") were produced.

To determine changes in the concentration of DODCI in direction of depth, the distribution in direction of depth of concentrations of iodine atoms based on DODCI were measured using an electronic spectroscopic analyzer (hereafter "ESCA"). This indicated that the concentrations varied virtually linearly in proportion to the depth.

With the wavelength of the exciting light fixed at 590 nm, measuring the emission of this optical thin film showed that emission patterns differ depending on the direction of radiation of the exciting light, light intensity, and the direction in which the emission is detected. For example, when the exciting light is radiated onto the surface where the concentration of DODCI is higher and the emission is measured from the radiation side of the exciting light, the maximum wavelengths of the emission were 614±1 nm and 710±1 nm, irrespective of the intensity of the exciting light. When the exciting light is radiated onto the surface where the concentration of DODCI is lower and the emission is measured from the side on which the exciting light is radiated, the maximum wavelengths of the emission vary with the intensity of the exciting light, showing 599 or 600 nm for little intensity, and 612 or 620 nm for great intensity.

EXAMPLE 12

As one component, DODCI was dissolved in acetone at a concentration of 0.1 g/litter and filled into one of the liquid sumps (18), as shown in FIG. 2. As the other component, PMMA was dissolved in acetone at a concentration of 1 g/litter, and filled into another sump (18). By operating the nozzle on-off mechanism (2) and shutter (7) provided for each component, these solutions were sprayed alternately from the spray nozzle for each component of the material, as illustrated in FIG. 1, into vacuum vessel (3). Throughout the operation, the pressure inside the vacuum vessel (3) was maintained at $10^{-4}$ Pa or below with a turbo molecular pump, a rotary pump and a cold trap cooled with liquid nitrogen. By regulating the intervals of the opening and closing time of two systems of nozzle on-off mechanism (2) and shutter (7), the following operation was repeated 100 times: spraying for a certain amount of time a solution in which DODCI was dissolved in acetone, then discontinuing the spraying of both solutions and completely removing the acetone from the substrate, then spraying for a certain amount of time a solution in which PMMA was dissolved in acetone, and then stopping both sprayings to completely remove the acetone from the substrate. Throughout the process, by adjusting a nozzle on-off mechanism (2) and a shutter (7), with a dead time taken into account, the average rate of spraying was controlled at 250 microlitter/min. for DODCI solutions, and at 75 microlitter/min. for PMMA solutions. While the above operation was in progress, the temperature of the substrate (19) was maintained at 40°±2° C. by means of substrate heating unit (8) and substrate temperature measuring unit (9). The DODCI-containing thin film deposited on the substrate (19) was heated to 150° C. in a vacuum by the hot press method, and was put to a hydrostatic pressure test of 4.9 MPa to give optically transparent thin films.

If expressed in weight %, the concentrations of DODCI in this optical thin film are indicated in Table 2.

When the particle size of DODCI in these thin films was measured by the X-ray small angle scattering method, the results as indicated in Table 2 were obtained.

TABLE 2

| Example No. | Average solution spray rate DODCI [μl/min] | Average solution spray rate PMMA [μl/min] | DODCI concentration [in optical thin layer] [weight %] | DODCI Particle size [nm] |
| --- | --- | --- | --- | --- |
| 12 | 250 | 75 | 25 | 74 |
| 13 | 200 | 80 | 20 | 75 |
| 14 | 150 | 85 | 15 | 73 |
| 15 | 100 | 90 | 10 | 75 |
| 16 | 50 | 95 | 5.0 | 74 |
| 17 | 25 | 97.5 | 2.5 | 75 |
| 18 | 10.11 | 100 | 1.0 | 73 |
| 19 | 5.03 | 100 | 0.5 | 75 |
| 20 | 2.51 | 100 | 0.25 | 74 |

EXAMPLES 13 TO 20

Except that the average spray rates of the DODCI solution were varied as indicated in Table 2, by the same procedure as in Example 12, an optical thin film was produced. The DODCI particle sizes were measured by the X-ray small angle scattering method. The results are indicated in Table 2 above.

These results indicate that by the process according to the instant invention, it was possible to control the particle size of the coloring matter (DODCI) in the optical thin film to a constant value and at the same time, to vary the average concentration of coloring matter in the thin films.

EXAMPLE 21

Figure 6:
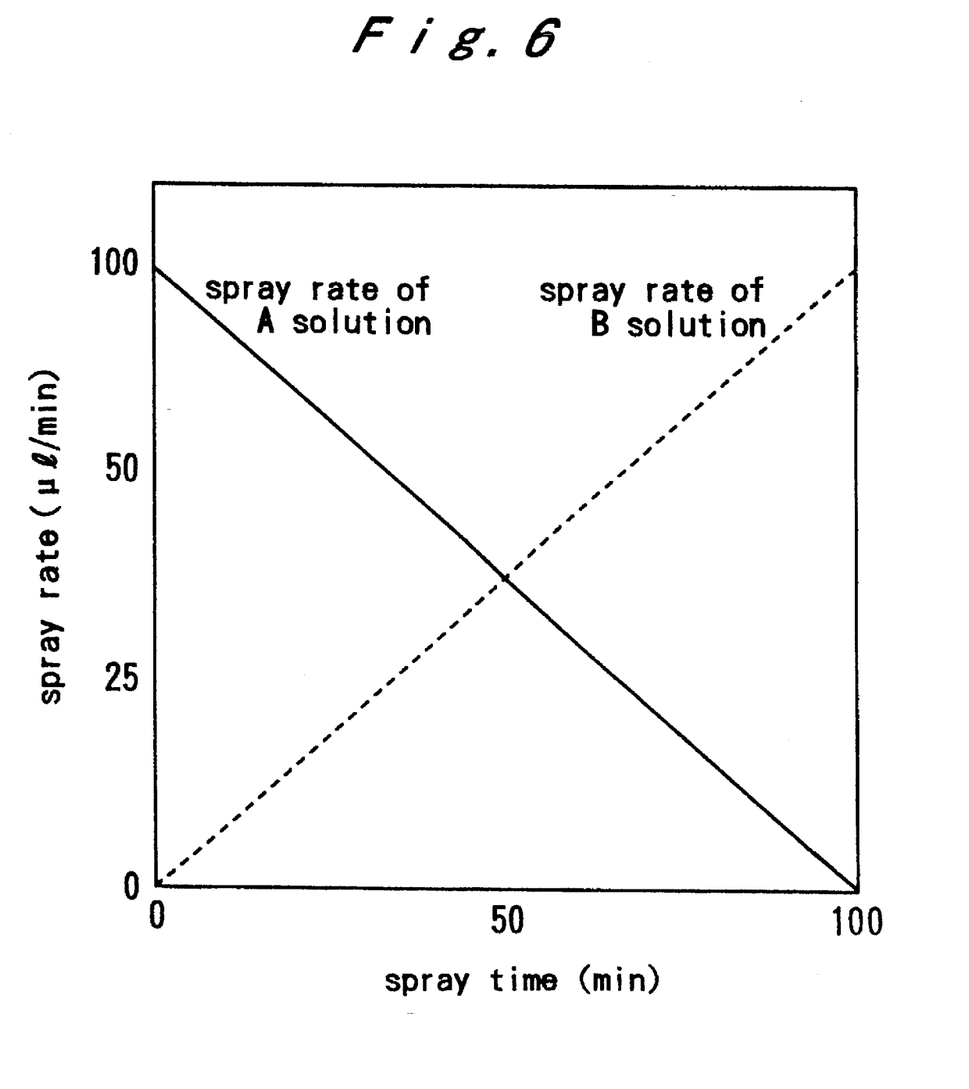
FIG. 6 is graph showing a correlation between spray rates of two liquids as a function of time.

A solution in which as one component, DODCI and PMMA were dissolved in acetone at a concentration of 10 mg/litter and 990 mg/litter, respectively, (hereinafter "A liquid") was filled into one of the liquid sumps (18) as shown in FIG. 2. A solution in which as another component, DODCI and PHPMA were dissolved in acetone at a concentration of 10 mg/litter and 990 mg/litter, respectively, (hereafter "B liquid") was filled into a second liquid sump (18). By operating the nozzle on-off mechanism (2) provided for each component, these solutions were sprayed from the spray nozzle adapted for each component as illustrated in FIG. 1 into vacuum vessel (3), while as indicated in FIG. 6, the spray rates were varied interrelatedly. The spray operation was initiated with the spray rate of A liquid at 100 microlitter/min., and with that of B liquid at zero. In proportion to time, the spray rate of A liquid was decreased, and that of B liquid was increased, making the sum of both rates equal to a total of 100 microlitter/min. While the rate was maintained, ten minutes later, the spray rate of A liquid was set to zero, while that of B liquid was set to 100 microlitter/min.

Throughout the operation, the pressure inside the vacuum vessel (3) was maintained at $10^{-4}$ Pa or below with a turbo molecular pump, a rotary pump and a cold trap cooled with liquid nitrogen. The temperatures of substrate (19) were maintained at 40°±2° C. with substrate heating unit (8) and substrate temperature measuring unit (9). The DODCI-containing PMMA/PHPMA composite thin films on substrate (19) were heated to 150° C. in a vacuum by the hot press method and put to a hydrostatic pressure of 4.9 MPa to give an optically transparent thin film.

The concentration of iodine atoms in a direction of depth in this optical thin film was measured with an ESCA, giving a constant measurement value. It proved that the concentration of DODCI was constant in the direction of depth. Calculated in terms of charge rate, it was 1 weight %. The ratio of PMMA/PHPMA in this thin film is presumed to vary continuously in a direction of depth. Then, the thin film was ground obliquely in the direction of depth, and the microscopic total reflection FT-IR spectrum of the ground surface was measured. It was confirmed that the absorption speed the alcoholic hydroxyl group increased or decreased in the direction or depth and in proportion to the depth.

When the emission of this optical thin film was measured with the wavelength of the exciting light fixed at 590 nm, it was revealed that emission patterns differ depending on the direction of radiation of the exciting light, the intensity thereof, and the direction in which the emission is detected. For example, when the exciting light was radiated onto the surface where the concentration of DODCI was higher and the emission was measured from the radiation side of the exciting light, the maximum wavelengths of the emissions were 618±1 nm and 641±1 nm, irrespective of the intensity of the exciting light. When the exciting light was radiated onto the surface where the concentration of DODCI was lower and the emission was measured from the side on which said exciting light was radiated, the maximum wavelengths of the emissions varied with the intensity thereof, showing 613±2 nm for little intensity, and 618±1 nm and 641±1 nm for great intensity.

EXAMPLE 22

As one component, DODCI was dissolved in acetone at a concentration of 10 mg/litter, and was filled in one of the liquid sumps (18), as shown in FIG. 2. As a second component, DODCI was dissolved in methanol at a concentration of 10 mg/litter, and was filled in a second liquid sump (18). As a third component, PMMA was dissolved in acetone at a concentration of 1 g/litter and was filled in a third sump (18). By the operation of nozzle on-off mechanisms (2) for each component and a shutter (7), these solutions were sprayed in order from the spray nozzles (1) for each component as indicated in FIG. 1. Throughout the process, the pressures in the vacuum vessel (3) were maintained at $10^{-4}$ Pa or below by means of a turbo molecular pump, a rotary pump and a liquid nitrogen-cooled cold trap. By regulating the intervals of the open-close time of the nozzle on-off mechanisms (2) and the shutters (7) available in three lines, the following operations were repeated 100 times. The DODCI-acetone solution was sprayed for a certain amount of time, then with all the shutters closed, spraying was stopped and the acetone on the substrate was completely removed. Subsequently, the PMMA-acetone solution was sprayed for a certain amount of time, and with all the shutters closed again, spraying was discontinued, and the acetone on the substrate was completely removed. Then, the DODCI-methanol solution was sprayed for a certain amount of time, and with all the shutters closed, the spraying operation was stopped and the acetone on the substrate was completely eliminated. During the operation, by adjusting the open-close intervals of the nozzle on-off mechanism (2) and the shutter (7), with a dead time taken into account, the average spraying rates were controlled to 10 microlitter/min. for the DODCI-acetone solution, to 40 microlitter/min. for the DODCI-methanol solution, and to 49.5 microlitter/min. for the PMMA solution. At the same time, the temperatures of the substrate (19) were maintained at 40°±2° C. by means of substrate heating unit (8) and substrate temperature measuring unit (9). The DODCI-containing PMMA thin films on the substrate were heated to 150° C. in vacuum environments by the hot press method, then put to a hydrostatic pressure of 4.9 MPa, to give optically transparent thin films.

If expressed in weight %, the concentration of DODCI in these thin films are listed in Table 3.

TABLE 3

| Example No. | Average solution spray rate | | | DODCI concentration [in optical thin layer] [weight %] | DODCI Particle size [nm] |
|---|---|---|---|---|---|
| | DODCI acetone solution [μl/min] | DODCI methanol solution [μl/min] | PMMA [μl/min] | | |
| 22 | 10 | 40 | 49.5 | 1.0 | 75 and 4 |
| 23 | 20 | 30 | 49.5 | 1.0 | 74 and 3 |
| 24 | 30 | 20 | 49.5 | 1.0 | 73 and 3 |
| 25 | 40 | 10 | 49.5 | 1.0 | 75 and 4 |
| 26 | 50 | 0 | 49.5 | 1.0 | 73 |
| 27 | 0 | 50 | 49.5 | 1.0 | 3 or 4 |

EXAMPLES 23 TO 27

Except that the average spray rates of the three components were varied as indicated in Table 3, by the same procedure as in Example 22, an optical thin film was produced. The particle sizes of DODCI in these solutions were measured by the X-ray small angle scattering method. The results are indicated in Table 3 above.

These results indicate that by the process according to the instant invention, it was possible to control the particle size of the coloring matter (DODCI) in the optical thin film to a constant value and at the same time, to vary the average concentrations of coloring matter in the thin films.

Analyses of the concentration of DODCI in the depth direction of these thin films confirmed that they had a lamination structure of a layer which contained DODCI and a layer which did not.

Figure 7:
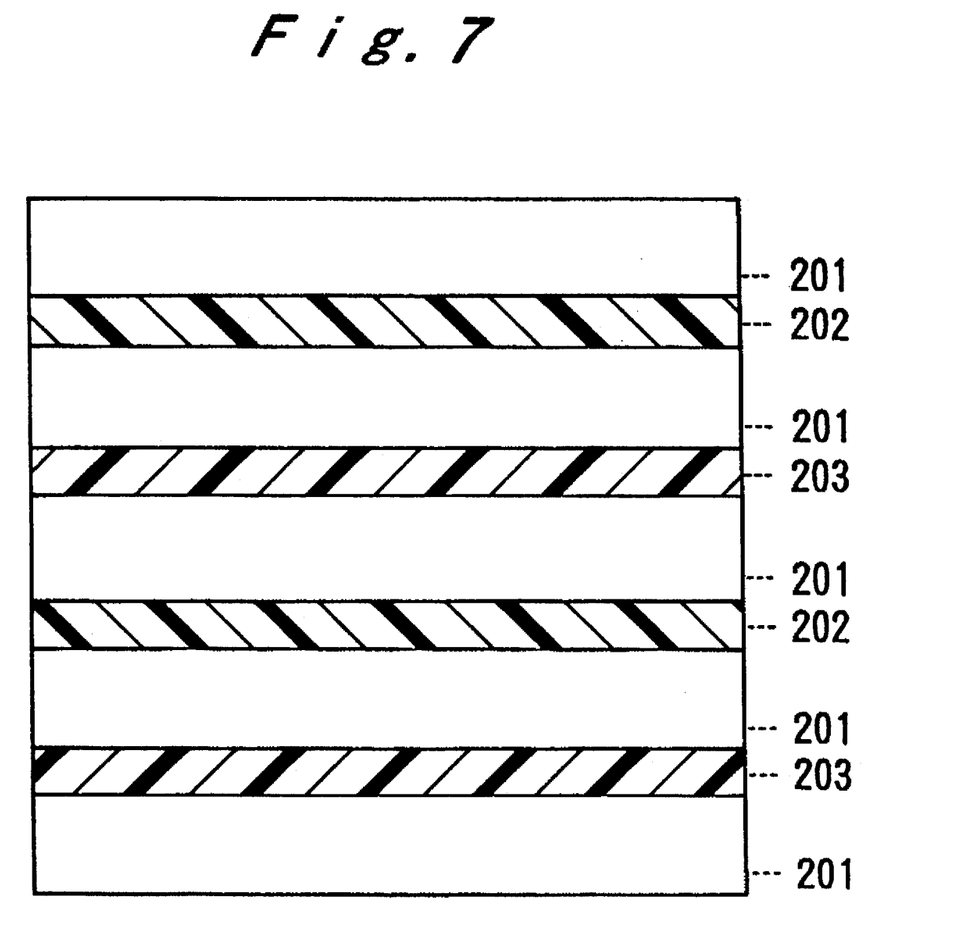
FIG. 7 is an enlarged view showing the cross sectional structure of composite optical thin film.

In addition, from the measurements of the particle sizes of DODCI in the thin films in Examples 26 and 27, those in Examples 22 or 25 are presumed to have a sectional structure in which a layer having a DODCI particle size of 3 or 4 nm (202) and that having a 74±1 nm (203) are alternatively laminated between a layer containing no DODCI (201).

It was confirmed that the emission of these optical thin films differs in transitional response depending on the intensity of exciting light.

EXAMPLE 28

As one component, PMMA was dissolved in acetone at a concentration of 1 g/litter, and filled into one of the liquid sumps (18) as shown in FIG. 2. As another component, PC was dissolved in dichloromethane at a concentration of 1 g/litter, and filled into another sump (18). By operating the nozzle on-off mechanism (2) and shutter (7) provided for each component, these solutions were sprayed alternately from the spray nozzle adapted for each component as illustrated in FIG. 1 into vacuum vessel (3). During the operation, the pressure inside the vacuum vessel (3) was maintained at $10^{-4}$ or below with a turbo molecular pump, a rotary pump and a cold trap cooled with liquid nitrogen. The following procedures were repeated 100 times: regulating the intervals of the opening and closing time of two systems of nozzle on-off mechanism (2) and shutter (7), to spray for a certain amount of time a solution in which DODCI was dissolved in acetone, then discontinuing the spraying of both solutions and completely removing the acetone on the substrate. Throughout the operation, by controlling the opening and closing time of the nozzle on-off mechanism (2) and the shutter, with the dead time taken into account, the average spray rate was controlled to 10 microlitter/min for the PMMA acetone solution, and to 40 microlitter/min for the PC dichloromethane solution. Meanwhile, the temperatures of the substrate (19) were maintained at 40°±2° C. by means of the substrate heating unit (8) and the substrate temperature measuring unit (9). The PMMA/PC composite thin film deposited on the substrate (19) was heated to 150° C. in a vacuum by the hot press method, and put to a hydrostatic pressure of 4.9 MPa to give an optical transparent thin film.

The refractive index of each of the thin films was measured with an Abbe refractive index meter, giving the results as shown in Table 4.

TABLE 4

| Example No. | Average speed of solution spraying | | PMMA:PC weight ratio | Refractive index |
|---|---|---|---|---|
| | PMMA [μl/min] | PC [μl/min] | | |
| 28 | 10 | 40 | 1:4 | 1.566 |
| 29 | 20 | 30 | 2:3 | 1.547 |
| 30 | 25 | 25 | 1:1 | 1.538 |
| 31 | 30 | 20 | 3:2 | 1.529 |
| 32 | 40 | 10 | 4:1 | 1.510 |

EXAMPLES 29 TO 32

Except that the average spray rates of DODCI solution were varied as indicated in Table 4, by the same procedure as in Example 28, optical thin films were produced. The refractive index of each of these thin films was measured with an Abbe refractive index meter. The results are indicated in Table 4 above.

EXAMPLE 33

Thoroughly removing oxygen gas through bubbles of nitrogen gas in a solution in which cadmium perchlorate 6 hydroxide is dissolved in acetonitrile at a concentration of $2 \times 10^{-3}$ mol/litter. Then, using hydrogen sulfide gas diluted to 0.02 volume % with helium gas in this solution, colloidal dispersion liquid of cadmium sulfide (CdS) was produced. The concentration of CdS in the dispersion liquid was 0.289 g/litter. The dispersion liquid was filled as one component in one of the liquid sumps (18) as indicated in FIG. 2. As another component, PC was dissolved in dichloromethane at a concentration of 1.0 g/litter, and filled into another liquid sump (18). These solutions were sprayed continuously for 20 minutes from the spray nozzles for each component as indicated in FIG. 1 into the vacuum vessel (3), while by regulating the opening and closing time of the nozzle on-off mechanisms (2), the spray rates were controlled to 100 microlitter/min. for the CdS dispersion liquid, and to 100 microlitter/min. for the PC solution. During the operation, the pressures in the vacuum vessel (3) were maintained at $10^{-4}$ Pa or below using a turbo molecular pump and a rotary pump and a cold trap cooled with liquid nitrogen. The CdS-containing PC thin film deposited on the substrate (19) was heated to 250° C. in a vacuum by the hot press method and put to a hydrostatic pressure of 4.9 MPa, to give an optically transparent thin film.

If expressed in weight %, the concentration of CdS in this optical thin film is indicated in Table 5.

TABLE 5

| Example No. | Average speed of solution spraying | | Concentration of CdS (in optical thin layer) [weight %] | Particle size of CdS [nm] |
|---|---|---|---|---|
| | CdS [μl/min] | PC [μl/min] | | |
| 33 | 100 | 100 | 22 | 10 |
| 34 | 80 | 100 | 19 | 11 |
| 35 | 60 | 100 | 15 | 10 |
| 36 | 40 | 100 | 10 | 9 |
| 37 | 20 | 100 | 5 | 11 |

The particle size of CdS in this thin film was measured by the X-ray small particle scattering method, and the results are indicated in Table 5 above.

EXAMPLES 34 TO 37

Except that the average spray rates of Cd fine dispersion liquid were varied as indicated in Table 5, by the same procedure as in Example 33, an optical thin film was produced. The particle sizes of CdS in these thin films were measured by the X-ray small angle scattering method. The results are indicated in Table 5 above.

These results indicate that by the process according to the instant invention, it was possible to produce thin films of various concentrations while maintaining the particle sizes of CdS.

EXAMPLE 38

Glass on whose surface a transparent conductive film of indium-tin composite oxide (hereafter ITO glass) was deposited was employed as a substrate.

As one component, 4-heptyloxy-4' cyanobiphenyl (hereafter, 7OCB), a liquid material, was dissolved in dichloromethane at a concentration of 1 g/litter, and was filled in one of the liquid sumps (18). As another component, nitrile butadiene rubber (hereafter, NBR) was dissolved in dichloromethane at a concentration of 1 g/litter, and was filled into another liquid sump (18). These solutions were sprayed simultaneously from the spray nozzles adapted for each nozzle into the vacuum vessel (3). Throughout the spraying operation, the pressures in the vacuum vessel (3) were maintained at $10^{-4}$ Pa or below by a turbo molecular pump, a rotary pump, and a cold trap cooled with liquid nitrogen. By regulating the open-close intervals of the nozzle on-off mechanisms (2), the spray rates were controlled to 50 microlitter for the 7OCB solution, and to 40 microlitter for the NBR solution. Throughout the process, the temperatures of the ITO glass substrate (19) were maintained at 40°±2° C. using substrate heating unit (8) and substrate temperature measuring unit (9). Onto the liquid crystal 7OCB-containing NBR thin film deposited on the substrate (19) was laid another ITO glass. The pair of glass films was heated to 150° C. in a vacuum and put to a hydrostatic pressure of 4.9 MPa, to give a liquid crystal/high molecular composite thin film sandwiched between transparent electrodes.

This thin film is normally white, but when a DC voltage is applied between the transparent electrodes, the liquid crystal becomes oriented and transparent.

This liquid crystal/high molecular composite thin film was peeled off the ITO glass and was heated in ethanol, thus dissolving out the liquid crystal. The remaining high molecular portion was observed with a scanning electron microscope, indicating that the high molecular portion was a minute sponge microscopic structure.

As has been described in detail, the present invention makes it possible to produce high-quality and highly functional composite optical thin films at much lower temperatures than those at which organic optical materials decompose. The present invention also makes it possible to produce composite optical thin films of organic optical materials made up of two or more components and whose structure is controlled in a microscopic range of less than a micrometer. It is also possible to produce composite optical thin films of organic materials made up of two or more components with the concentration of such components being varied in the depth direction thereof.

The organic optical materials employed in the process for producing the optical thin films according to the present invention may be of any given type if they can be formed by heating and/or with pressure. In accordance with the instant invention, the solvent optimal for each component of organic materials of two or more components is selectable. Accordingly, the present invention is very useful in the development and improvement of composite optical materials.

We claim:

1. A process for producing a film, said process comprising:

forming a solution or dispersion of film material;

spraying said solution or dispersion of said film material from a spray nozzle onto a substrate within a vacuum vessel while maintaining the interior of said vessel under a vacuum, said maintaining comprising evacuating said interior to a pressure not greater than $1 \times 10^{-4}$ Pa;

allowing the thus sprayed film material to deposit on said substrate; and after deposition of said film material on said substrate, heating the thus deposited film material.

2. A process as claimed in claim 1, further comprising pressurizing said deposited film material.

3. A process as claimed in claim 1, further comprising pressurizing said deposited film material during said heating.

4. A process as claimed in claim 1, comprising continuously decreasing the rate of said spraying.

5. A process as claimed in claim 1, comprising continuously varying the concentration of said film material in a direction of depth of said deposited film material.

6. A process as claimed in claim 1, comprising forming separate solutions or dispersions of different film materials, spraying said different film materials from respective separate spray nozzles onto said substrate, and allowing the thus sprayed different film materials to deposit on said substrate as a composite film.

7. A process as claimed in claim 6, comprising simultaneously spraying said different film materials.

8. A process as claimed in claim 6, comprising alternately spraying said different film materials.

9. A process as claimed in claim 6, wherein said composite film comprises an optical film having a structure of particles of at least one of said film materials.

10. A process as claimed in claim 1, wherein said deposited film material has a structure including particles therein.

11. A process as claimed in claim 1, wherein said forming comprises dissolving said film material in a solvent.

12. A process as claimed in claim 1, wherein said film material comprises organic material.

13. A process as claimed in claim 1, wherein said film material comprises inorganic material.

14. A process as claimed in claim 1, wherein said film material comprises at least one organic high molecular compound.

15. A process as claimed in claim 1, wherein said film material comprises at least one organic low molecular compound.

16. A process as claimed in claim 1, wherein said film material comprises liquid crystal material.

* * * * *